Figure 1:
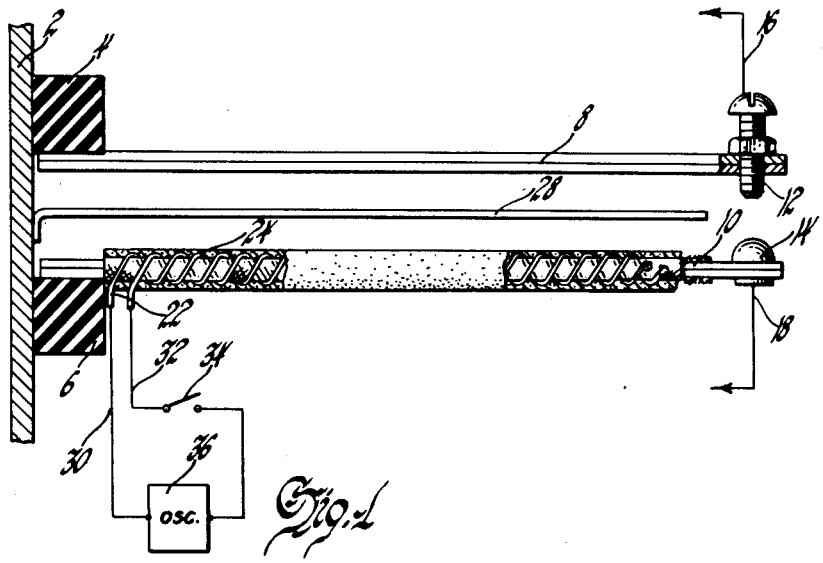

July 24, 1956  A. W. SCHLUCHTER  2,756,295
HUMIDITY SENSING DEVICES
Filed Aug. 24, 1953

INVENTOR
Alfred W. Schluchter
BY
L. D. Burch
ATTORNEY

United States Patent Office 2,756,295
Patented July 24, 1956

2,756,295

HUMIDITY SENSING DEVICES

Alfred W. Schluchter, Detroit, Mich., assignor to General Motors Corporation, Detroit, Mich., a corporation of Delaware Application August 24, 1953, Serial No. 375,937

9 Claims. (Cl. 200—61.06)

This invention relates to improvements in humidity sensing devices used in humidity measuring and controlling apparatus and the like. More particularly, the invention relates to such devices that depend for the basis of their operation on the absorption of water vapor by an hygroscopic substance such as lithium chloride or lithium bromide or other equivalent salt and the heating effect of an electric current passed through the saturated solution formed by the hygroscopic salt and water absorbed thereby.

The heating of the salt and saturated solution by the passage of an electric current between a pair of electrical conductors or electrodes associated with the humidity sensing device causes the water in solution to escape to atmosphere until a temperature is reached where the amount of water escaping from the heated solution is just equal to the absorption of water vapor by the salt from the atmosphere. The temperature at this equilibrium condition may then be measured by a suitable temperature bulb or the like as a measure of the humidity of the surrounding atmosphere, or the heat generated under these conditions may be used to effect operation of a calibrated thermostatic device to exercise a control function in humidity regulating or control apparatus for regulating or maintaining a desired humidity condition.

Structurally, such devices may comprise a pair of spaced conductors or electrodes bifilarly wound around a temperature bulb or thermostatic element covered with a tape or wick impregnated with the hygroscopic salt, the conductors being connected in open circuit relation, usually to a source of direct current or low frequency local power line current. The conductors and saturated lithium bromide or lithium chloride and water vapor solution constitute, in effect, an electrolytic cell in which the ensuing electrolytic action upon passage of electric current therethrough evolves lithium, which combines with the water to form lithium hydroxide in solution, and liberates free nascent hydrogen at the cathode electrode or negative conductor and bromine or chlorine at the anode electrode or positive conductor. If the electrolytic action is permitted to continue for any significant period of time, the bromine or chlorine eventually migrates from the surface of the anode resulting in decomposition of the electrolyte and polarization of the cell, thereby changing the chemical and physical characteristics thereof. The calibration of the sensing element thus will be altered resulting in loss of usefulness of the sensing device and requiring frequent replacement thereof.

Accordingly, the present invention has among its general objects to provide an improved apparatus for humidity sensing devices of the above character, particularly in regards to prolonging their reliability and usefulness in installations where the hygroscopic substance cannot be continually replenished or the sensing element replaced. More specifically, the invention has for its objects to provide a method of and apparatus for preventing the aforementioned electrolytic decomposition of the hygroscopic substance and the polarization of the cell and to accomplish the foregoing desirable ends without structural modification of existing forms of humidity sensing devices.

In accordance with the method of the present invention the aforementioned electrolysis or decomposition of the electrolyte and polarization of the cell is substantially halted or mitigated by periodically reversing the direction of current flow through the electrolyte at a sufficiently rapid and recurring rate in relation to the characteristic time, herein defined as the time in which the bromine or chlorine just commences to be liberated out of solution and to migrate from the surface of the anode if the electrolytic process were permitted to proceed without interruption or reversal of the current flow through the electrolyte, such that the cyclic frequency variations or period of unidirectional flow of the alternating current is less than the characteristic reaction time for the particular electrolyte.

By resort to a sufficiently high frequency alternating current rather than to the customary direct current or low frequency heating source previously employed in humidity sensing devices of this character, the aforementioned electrolytic process is permitted to continue in one direction for a period of time less than that which causes the hydrogen and chlorine or bromine to be liberated and to migrate from the surface of their respective electrodes and is then reversed to cause these actions to proceed in the opposite direction for substantially the same period of time, whereby the net effect of the actions proceeding in opposite directions is to balance or nullify and thus obtain a stable equilibrium condition of the electrolyte in which electrolytic decomposition is substantially completely eliminated.

Figure 2:
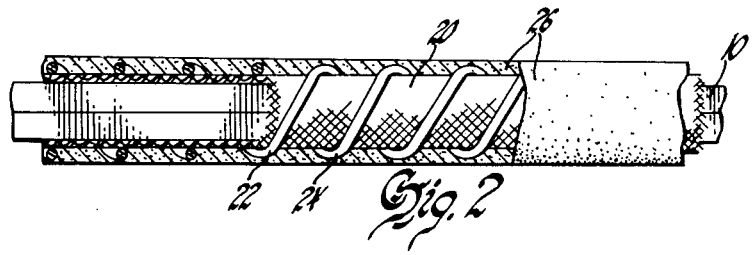
Figure 3:
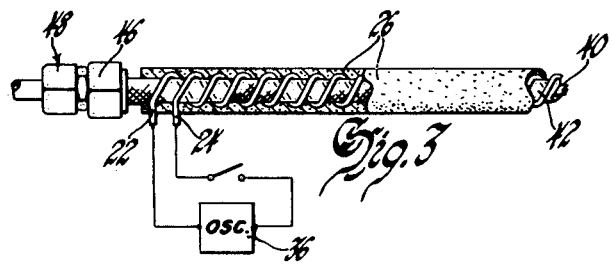
Figure 4:
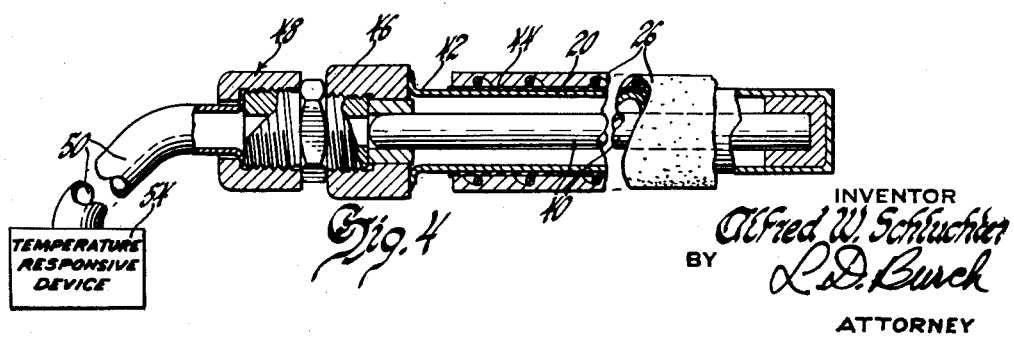

The above defined characteristic time is a function of various chemical and physical factors including the particular salt or hygroscopic substance employed in the electrolyte, the concentration and temperature of the electrolyte and the composition of the electrode materials, changes in any or all of which factors will affect the time in which the described actions occur. Thus, in the selection of a suitable minimum or lower frequency, at least, it may be necessary to consider all of these factors and to observe their range of variation over the range of operation for which the humidity sensing device is intended. It has been found, however, for the purposes and applications served by the present invention that the frequency employed will be substantially higher than the available power line frequency, starting perhaps with a lower frequency in the neighborhood of, say, around 500 cycles per second and extending upwards of and beyond 4,000 C. P. S. Frequencies in the region of 15,000 C. P. S. and beyond have been employed and have effected noticeable improvements in the accuracy, reliability and serviceability of humidity sensing and/or control devices some of which—to which the principles and concepts of the present invention are specially adapted—are described and illustrated in the following description and accompanying drawings, wherein:

Figs. 1 and 2 illustrate the application of the principles of the present invention to one form of humidity sensing and control device; and Figs. 3 and 4 illustrate the application of the present invention to another form of humidity sensing device.

The apparatus shown in Figs. 1 and 2 is a hygrostat or relative humidity responsive control device comprising a base 2 having a pair of spaced insulating supports 4 and 6 fixedy secured thereto with each support mounting one end of a respective one of a pair of spaced bi-metallic strips or bars 8 and 10. The strips 8 and 10 carry at their free ends a pair of contact members 12 and 14 collectively forming an electrical switch adapted to be connected by the conductors 16 and 18 in an electric control circuit for exercising a control function in a humidity control or regulator apparatus for maintaining the moisture content of air at a given predetermined amount within a prescribed enclosure.

Bi-metallic strip 10 may have wound around the major portion of its length a layer of electrical insulating material, such as woven glass fabric 20, mounting a bifilarly wound heating coil constituted by a pair of spaced parallel conducting wires 22 and 24, preferably of silver or the like. The ends of the wires 22 and 24 adjacent the contact element 10 on strip 8 are not connected together to form a continuous circuit but are maintained in open circuit relation so that the potential applied to the other ends of these wires will exist substantially throughout their entire length. The assembly of glass fabric 20 and conducting wires 22 and 24 is then completely coated with a layer of hygroscopic substance 26, such for example as lithium chloride, lithium bromide or other equivalent salt. A thermal insulating shield 28 secured to the base 2 between the two supports 4 and 6 extends between the two bi-metal strips 8 and 10 to prevent heat flow therebetween upon the passage of heating current through the heating coil. The ends of the wires 20 and 22 adjacent the fixed end of the bi-metal strip 10 are connected over conductors 30 and 32, the latter including switch 34, to the output terminals of an oscillator or wave generator 36, shown in block diagrammatic form. To assure sufficient power output under all conditions, the oscillator may have an additional final power amplification stage included therein but, for the most part, practically any form of conventional oscillator having a fairly stable or constant amplitude output may be employed for the purposes of the present invention. The output frequency of the oscillator, in accordance with the invention, should be such that the unidirectional period or, more properly, the half-period thereof is substantially less than the characteristic time of the particular electrolyte of the sensing device over the range of operation of the sensing device. Frequencies upwards of 500 C. P. S. and extending past 15,000 C. P. S. have been mentioned earlier, and, conceivably, much higher frequencies could be employed.

Fig. 3 illustrates another form of humidity sensing device or humidity cell which employs a temperature bulb 40 within a thin-walled metal tube 42. The tube 42 mounts a thin sleeve 44 of electrical insulating material on which is wound the bifilar heating coil arrangement of Fig. 2 constituted by the spaced open-circuited wires 22 and 24 covered with an hygroscopic coating of lithium bromide or the like. As in the hydrostat of Fig. 1, the wires 22 and 24 are connected in accordance with the present invention to a high frequency alternating source of supply 36.

The bulb 40 is formed of a thin-walled tube of high heat conductivity, such as copper, sealed at one end and filled with a thermosensitive fluid, such as glycerine, and is fitted at its other end within a bored header member 46. A standard fitting 48 threadably coupled to the header 46 connects a length of flexible tubing 50, which communicates with the bore in the temperature bulb through the header, to a conventional temperature responsive apparatus 54, such, for example, as a pressure gauge calibrated in terms of humidity or dew point or a bellows-actuated valve forming a part of an automatic humidity control system. Instead of the temperature bulb 40 a graduated thermometer bulb or conventional thermocouple device could be employed.

What is claimed is:

1. In a humidity sensing device comprising, in combination, heat responsive means, heating means on said heat responsive means, a hygroscopic coating covering said heating means and a source of alternating current connected to supply current to said heating means of a frequency substantially higher than sixty cycle local power supply frequency.

2. In a humidity sensing device comprising, in combination, heat responsive means, heating means on said heat responsive means, a hygroscopic coating covering said heating means and a source of alternating current connected to supply current to said heating means of a frequency of at least 500 cycles per second.

3. In a humidity sensing device comprising, in combination, heat responsive means, heating means on said heat responsive means, a hygroscopic coating covering said heating means and a source of alternating current connected to supply current to said heating means of a frequency of around 15,000 cycles per second.

4. In a humidity sensing device comprising, in combination, a temperature bulb, a bifilar heating coil including a pair of spaced open circuited conductors wound around said temperature bulb substantially along the length thereof, a hygroscopic coating covering said heating coil on said bulb and a source of alternating current connected to supply current of a frequency above 500 cycles per second to said conductors.

5. In a hygrostat including a support, a pair of spaced bi-metal elements mounted on said support, contact members carried by said elements, heating means on one of said bi-metallic elements, a hygroscopic coating covering heating means on said one bi-metallic element and a source of alternating current connected to supply current of a frequency above 500 cycles per second to said heating means.

6. In a humidity sensing element of the type which depends for its operation on the absorption of water vapor from atmosphere by hygroscopic substance and the heating effect of an electric current passed through the electrolyte formed by the hygroscopic substance and water vapor in solution by the application of a potential difference between a pair of conductor electrodes in contact with the electrolyte, the combination wherein said electric current is supplied by a source of alternating current having a half-period less than the characteristic time for decomposition of the electrolyte characterized by liberation of gases and migration thereof from the surface of said conductor electrodes.

7. The method of operating a humidity sensing element of the type which depends for its operation on the absorption of water vapor from atmosphere by a hygroscopic salt and the heating effect of an electric current passed through the electrolyte formed by the hygroscopic salt and water vapor in solution by the application of a potential difference between a pair of conductor electrodes in intimate contact with the electrolyte, which method comprises the step of applying alternating current through said electrolyte having a half-period less than the characteristic decomposition time for the particular electrolyte to prevent decomposition thereof.

8. In a humidity sensing element of the type which depends for its operation on the absorption of water vapor from atmosphere by a hygroscopic substance and on the heating effect of an electric current passed through the electrolyte formed by the hygroscopic substance and water vapor in solution by the application of a potential difference between a pair of conductor electrodes in contact with the electrolyte, the combination wherein said electric current is supplied by a source of alternating current having a half-period less than the characteristic time for decomposition of the electrolyte characterized by liberation of gases and migration thereof from the surface of said conductor electrodes and a frequency which is at least several times greater than local power line frequency.

9. The method of operating a humidity sensing element of the type which depends for its operation on the absorption of water vapor from atmosphere by a hygroscopic salt and on the heating effect of an electric current passed through the electrolyte formed by the hygroscopic salt and water vapor in solution by the application of a potential difference between a pair of conductor electrodes in intimate contact with the electrolyte, which method comprises the step of applying alternating current through said electrolyte having a half-period less than the characteristic decomposition time for the particular electrolyte to prevent decomposition thereof and a frequency which is at least several times higher than local power line frequency.

References Cited in the file of this patent

UNITED STATES PATENTS

| | | |
|---|---|---|
| 2,343,878 | Allen et al. | Mar. 14, 1944 |
| 2,359,278 | Allen et al. | Oct. 3, 1944 |
| 2,510,018 | Gillingham | May 30, 1950 |
| 2,563,341 | Kettering | Aug. 7, 1951 |
| 2,594,163 | Hayworth | Apr. 22, 1952 |